Jan. 4, 1927. 1,613,356
J. W. NORRISH
CHILD'S VEHICLE
Filed June 7, 1926 2 Sheets-Sheet 1
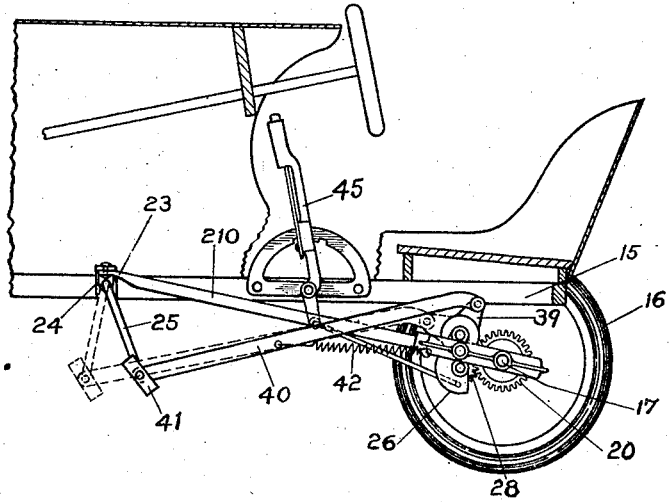
Fig. 1.
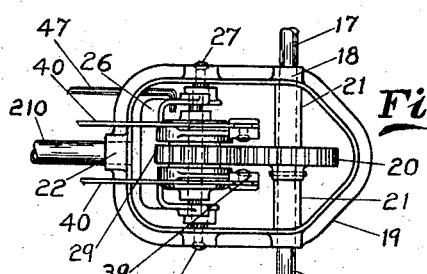
Fig. 2.
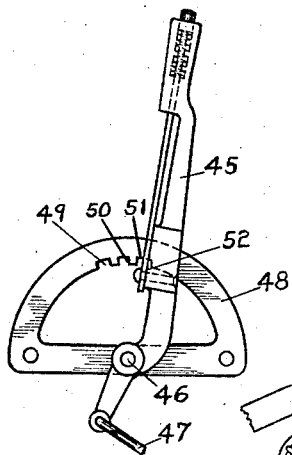
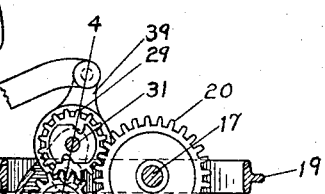
Fig. 3.
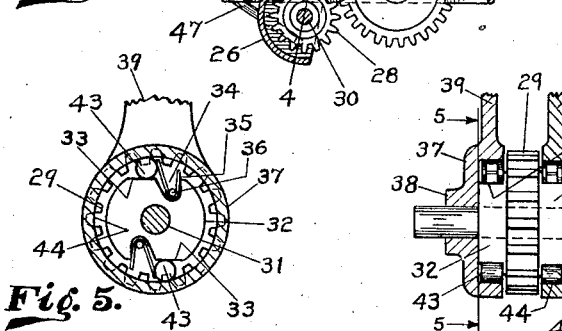
Fig. 5. Fig. 4.
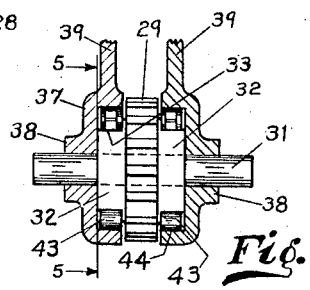
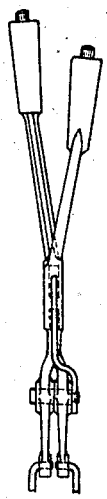
Fig. 11.
INVENTOR
John W. Norrish,
BY
ATTORNEYS.

Jan. 4, 1927. 1,613,356
J. W. NORRISH
CHILD'S VEHICLE
Filed June 7, 1926    2 Sheets-Sheet 2
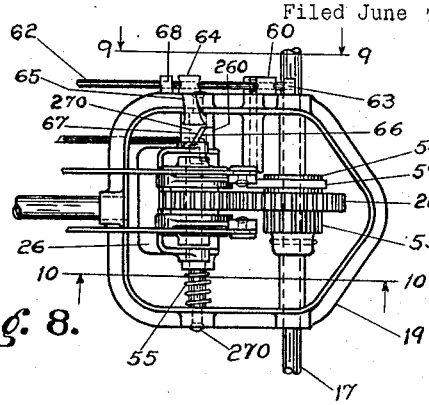
Fig. 8.
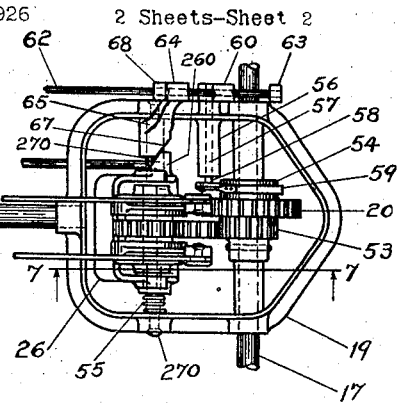
Fig. 6.
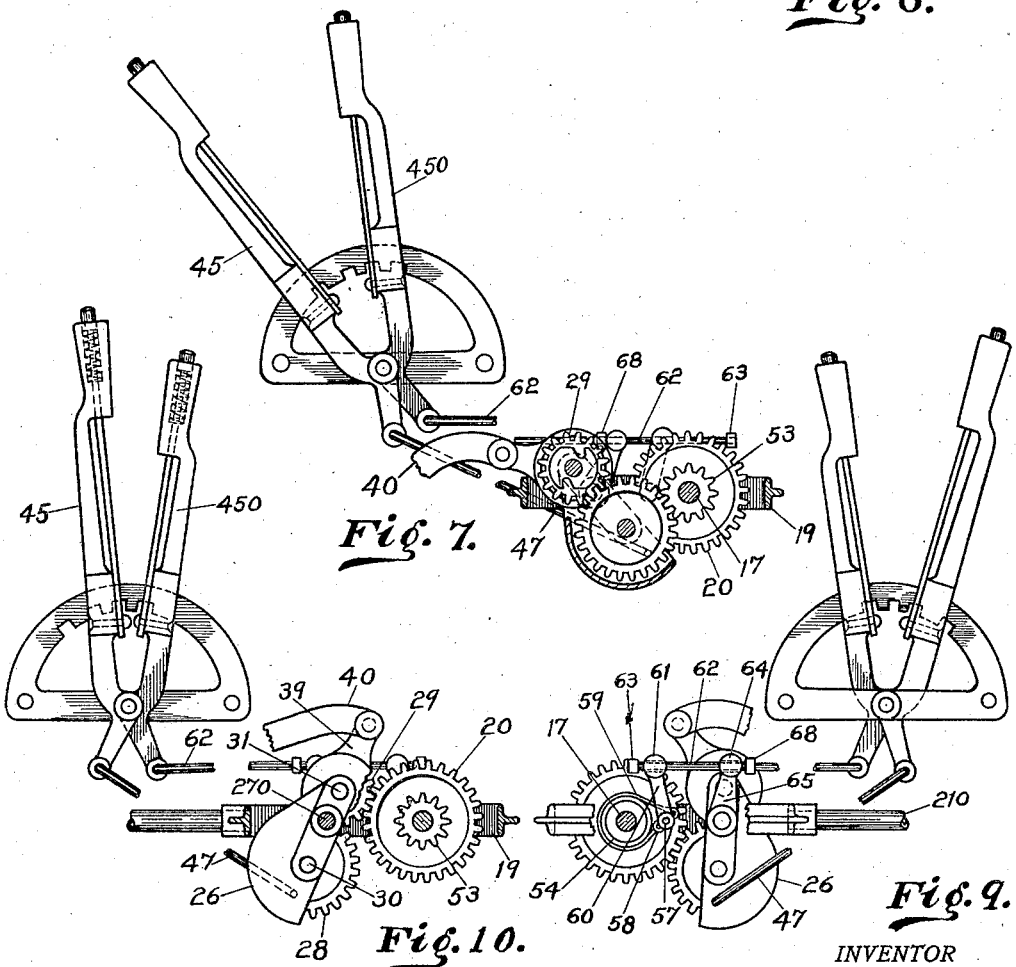
Fig. 7.
Fig. 10.
Fig. 9.
INVENTOR
John W. Norrish,
BY Murray and Ziegelter
ATTORNEYS.

Patented Jan. 4, 1927.

1,613,356

UNITED STATES PATENT OFFICE.

JOHN W. NORRISH, OF WOODLAWN, OHIO.

CHILD'S VEHICLE.

Application filed June 7, 1926. Serial No. 114,150.

This invention relates to power and transmission mechanism for propelling children's vehicles and the like, and has for an object the provision of a simple and efficient hand or foot actuated drive means.

Another object is to provide a device of this kind in which is embodied a novel drive mechanism which is adapted to use by children of various sizes.

Another object is to provide a foot propelled vehicle wherein the pedal stroke may be varied according to the length of the legs of the child operating it without impairing the efficiency thereof.

Another object is to provide mechanism of the class referred to which is adaptable to provide forward and reverse movement of the vehicle and also to provide a plurality of speeds.

These and other objects are attained by the means described herein and disclosed in the accompanying drawings, in which:

Fig. 1 is a fragmental cross sectional elevation of a vehicle having embodied therein a simplified form of the device of my invention, showing the drive mechanism in gear for forward movement of the vehicle.

Fig. 2 is a plan view of the simplified form on the drive mechanism of my invention.

Fig. 3 is an enlarged view of the device showing the drive mechanism in reverse gear.

Fig. 4 is a view taken on line 4—4 of Fig. 3.

Fig. 5 is a view taken on line 5—5 of Fig. 4.

Fig. 6 is a plan view of a modified form of the device of my invention, showing the parts in position for high speed.

Fig. 7 is a view taken on line 7—7 of Fig. 6 and showing the gear shift and brake levers in their relative positions.

Fig. 8 is a plan view showing the relation of parts of the device shown in Fig. 6 in low or reverse gear.

Fig. 9 is a view on line 9—9 of Fig. 8 showing the parts in low gear position.

Fig. 10 is a view taken on line 10—10 of Fig. 8 showing the parts in reverse gear.

Fig. 11 is a view showing the relation of levers looking toward the left on Fig. 10.

A vehicle bed 15 is suitably supported at its rear end upon a pair of drive wheels such as 16 secured to drive axle 17 extending through suitable bearings 18 in an open frame 19. A gear 20 is fixed to axle 17 and is retained against lateral movement relative to the frame 19 by spacers 21 which surround shaft 17. Torque rod 210 has its one end 22 fixed to frame 19 and its opposite end 23 fixed to bed 15 adjacent bracket 24, which carries a pair of pivotally mounted pedal arms 25. A yoke member 26 is pivotally mounted at its opposite sides upon the frame 19 forwardly of gear 20 by means of suitable studs 27 which extend through the side members of the frame. The yoke 26 is adapted to be moved about its pivotal mounting on studs 27 and to carry forward drive gear 28 or reverse drive gear 29 into and out of engagement with gear 20. The drive gears 28 and 29 are permanently in mesh with one another and are fixed to suitable shafts 30 and 31, respectively, which are journaled in the yoke 26. The shaft 31 carries a pair of discs 32 fixed thereto and to gear 29, the disc 32 having opposed flat faces 33 recessed as at 34 for receiving V-shaped spring members 35 which are loosely positioned therein by pins 36. As shown in Figs. 4 and 5, disc 32 is housed in a cup structure 37 movable about its hub 38 on shaft 31 by an integral arm 39.

Pedal rods 40 are pivotally connected at one end to arms 39 and pedals 41 connect the opposite end of each pedal rod to pedal arms 25. Retractile springs 42 connected to frame 19 and pedal rods 40 normally retain said rods and the arms 39 in a rearward position as shown in Fig. 1.

Interiorly of each cup 37 is a pair of cylindrical rollers 43, one of which is disposed between each of the flat faces 33 on disc 32 and the relatively movable inner circular wall 44 of the cup 37.

From the foregoing description it will be apparent that when either of the pedals 41 are pushed forwardly from the position shown in full lines to the position shown in dotted lines in Fig. 1, the cups 37 will be rotatably actuated whereupon the rollers 43 will effect a binding of the cup and disc 32 so that the gear 29 will be correspondingly actuated and will in turn move gear 28. When the gear 28 is in mesh with gear 20 the vehicle will be driven forwardly through shaft 17. The pedal rods 40 and cup 37 connected thereto through arms 39 are movable independently of each other so that alternate forward movement of the pedal 41 may be developed into continuous rotatory movement of gears 29 and 28. The return movement of pedal rods 40 and arms 39 under the action of springs 42 moves rollers 43 out of the binding relation with their associated parts so that no retrograde motion is transmitted to shaft 31 and gear 29.

This drive mechanism is especially advantageous as it is effective for driving the vehicle with either long or short strokes of the pedal rods, and in this way both large and small children may successfully propel the vehicle without requiring alteration or adjustment of parts.

A gear shift lever 45 is pivoted at 46 to the bed 15 and a link 47 connecting said lever and the yoke 26 serves to move the yoke about its pivotal mounting for effecting engagement of either drive gear 28 or reverse drive gear 29 with the gear 20 for securing forward or reverse motion of the vehicle, or said gears may be retained out of engagement with the gear 20 for attaining a neutral position of the drive mechanism. A rack 48 having notches 49, 50, and 51 for receiving a spring actuated pawl 52 on the gear shift lever retains the mechanism in the desired position.

The modified form of the device comprises the drive mechanism just described and in addition thereto a variable speed gear transmission and a brake mechanism. As shown in Figs. 6 and 8 a small gear 53 and a brake drum 54 are connected to shaft 17 on opposite sides of gear 20. In this embodiment the yoke 26 is mounted for lateral movement, a suitable spring 55 serving to normally retain it in such position as to permit meshing of gears 28 and 29 with gear 20. A suitable sleeve 56 extends from the side of frame 19 and carries a rotatable shaft 57 having a link 58 secured to the end thereof in alignment with a brake drum 54. A brake band 59 is passed about brake drum 54 and is adapted to be tightened about the brake drum by movement of the link 58 having the opposite ends of the brake band 59 secured thereto. A brake arm 60 is secured to the opposite end of the rotatable shaft 57 and is suitably perforated adjacent its free end 61 for slidably receiving a brake rod 62 provided with a stop 63 which engages end 61 and effects movement of the brake arm and link for applying the brake band 59 to the drum 54. In this embodiment the brake rod 62 also extends through a suitable perforation adjacent the end 64 of an arm 65 pivotally mounted upon a stud 270 intermediate the frame and the yoke 26. The yoke is provided with a hub 260 having a cam face 66. The arm 65 has a cam face 67 which co-operates with cam face 66, and rotatable movement of the arm 65 causes the inclined cam faces to ride one upon the other for effecting lateral movement of the yoke 26 against the resistance of spring 55, whereby to position gears 28 and 29 for engagement with the small or high speed gear 53 on shaft 17. A collar 68 secured to rod 62 effects movement of the arm 65 for shifting the gears. A brake lever 450 is substantially similar to gear shift lever 45 and has attached thereto the rod 62 carrying stops or collars 63 and 68. When the lever 450 is pulled rearwardly of the vehicle, rod 62 is moved forwardly, whereupon stop 63 engages brake arm 60 for applying the brake. When the lever 450 is pushed forwardly, the brake is released and further movement of the rod causes collar 68 to engage the end of arm 65 for shifting the yoke laterally and positioning gear 28 so that it may be moved into engagement with the high speed gear 53. The gear shift lever 45 operates as in the simplified form in low gear. When the yoke 26 is shifted to the position shown in Fig. 6, only the forward gear 28 may be engaged with high speed gear 53, the limit of movement of the yoke precluding meshing of the reverse gear and high speed gear.

The operation of the device is as follows: A child seated in a vehicle pushes forward the pedals 41 with alternate movements of his feet and this motion is converted into continuous rotary movement of shaft 31 and gear 29 as previously explained. When gear shift lever 45 assumes its center or intermediate position, no power is transmitted to shaft 17. This position is useful in permitting the vehicle to coast. When it is desired to propel a vehicle forwardly at low speed, the brake lever 450 is moved to an intermediate position and retained in a suitable notch on rack 48 so that neither collar 63 nor collar 68 engages either of the arms 60 or 65, so that the yoke 26 assumes the position shown in Fig. 8. Gear shift lever 45 is then moved forwardly as shown in Fig. 1, for engaging gears 28 and 20. If reverse movement of the vehicle is desired, the lever 45 is moved rearwardly to the position shown in Fig. 10. If high speed forward movement is desired, the gear shift lever 45 is first placed in a neutral position after which the lever 450 is moved forwardly for shifting the yoke 26 and the gear shift lever 45 is then pushed forward to engage gear 28 and high speed gear 53.

It should be noted that the operation of the driving structure is such that a child may propel the vehicle for a time and then cease pedaling without having to remove his feet from the pedals, while the vehicle continues to move under its own momentum whether the gearing be in mesh or out of mesh.

While I have shown and described herein an embodiment of my invention as applied to foot propelled vehicles, I do not desire to limit myself to the exact structure shown, since it may be modified for hand propulsion by the mere addition of a pair of hand levers pivotally mounted in the proximity of the vehicle bed and suitably connected with the arms 39 of the actuating means. A single hand lever may also be employed, if desired.

The structure, while comparatively small and inexpensive, makes possible a vehicle which is not only useful as a toy but is also instructive.

What I claim is:

1. In a device of the class described the combination of a frame, an axle extending through the frame, a gear on the axle, a yoke pivotally mounted in the frame, a pair of intermeshing gears rotatably carried by the yoke, means for driving one of the gears on the yoke and means for moving the yoke about its pivotal mounting for engaging the gear on the axle and a selected one of the gears on the yoke.

2. In a device of the class described the combination of a frame, a gear supported by said frame, a yoke pivotally mounted in the frame, a pair of intermeshing gears carried by the yoke, a clutch mechanism associated with one of the gears on the yoke for converting reciprocating movement of the clutch into one way rotation of said gear and means for selectively engaging the gears on the yoke with the gear on the frame.

3. In a device of the class described the combination of a pivotally mounted yoke, intermeshing gears rotatably mounted in parallelism with and on opposite sides of the pivotal mounting of the yoke, a third gear mounted in fixed relation to the pivotal mounting of the yoke, means for moving the yoke about its pivotal mounting for selectively engaging the gears on the yoke with the third gear, means associated with one gear on the yoke and adapted to be reciprocated in opposite directions about the center of rotation of said gear, for moving the gear with it in one direction and for return movement independently of the gear, and spring means for effecting said return movement.

4. In a device of the class described the combination of a pivotally mounted yoke, a pair of meshing gears carried thereby, a pair of parallel gears having a common axis in fixed parallelism with the pivotal mounting of the yoke, means for moving the yoke about its pivotal mounting for selectively engaging the gears on the yoke with one of the parallel gears, means for effecting lateral movement of the yoke whereby a gear on the yoke may be moved into engagement with the second parallel gear, and reciprocating means for rotating gears on the yoke.

5. In a drive and transmission mechanism the combination of a frame, an axle carried by the frame, parallel gears fixed to said axle, a yoke adapted for pivotal and lateral movement relatively to the parallel gears, a pair of intermeshing gears carried by the yoke and selectively engageable with one of the parallel gears upon pivotal movement of the yoke and means for effecting lateral shifting of the yoke for permitting engagement of the second parallel gear and a gear on the yoke.

6. In a device of the class described the combination of a shaft, a disc on said shaft having opposed peripheral flattened portions, a cup surrounding said disc and rotatable on the shaft, an arm on the cup, a roller disposed between the flattened portions of the disc and the interior of the cup for effecting frictional binding of the cup and disc when the cup is rotated in one direction and permitting free rotation of the cup relatively to the disc in the opposite direction and a yieldably mounted pedal rod connected to the arm for normally urging the cup in said last mentioned direction.

7. In a device of the class described the combination of a drive axle having a pair of gears and a brake drum secured thereto, a yoke pivotally mounted adjacent said axle and adapted to be shifted laterally on its pivotal mounting, meshing gears on the yoke adapted to be selectively engaged with one of the gears on the axle as the yoke is moved about its pivotal mounting, a lever for effecting pivotal movement of the yoke, a brake band on the drum, a brake arm for tightening the brake band on said drum, a second arm, cams carried by said second arm and the yoke for effecting lateral movement of the yoke for permitting engagement of a gear on the yoke with the second gear on the axle and a second lever for effecting movement of the brake arm and second arm.

8. In a device of the class described the combination of a pivotally mounted yoke, meshing gears mounted on said yoke, a pedal rod, means for converting reciprocal movement of the pedal rod into rotatory movement of a gear on the yoke, a third gear adapted to be selectively engaged by the gears on the yoke and means for moving the yoke about its pivotal mounting.

In testimony whereof, I have hereunto subscribed my name this 5th day of June, 1926.

JOHN W. NORRISH.